(12) United States Patent
Levkowetz

(10) Patent No.: US 8,542,634 B2
(45) Date of Patent: Sep. 24, 2013

(54) METHOD AND APPARATUS FOR PROVIDING MOBILITY TO A MOBILE NODE

(75) Inventor: Henrik Levkowetz, Lidingö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 366 days.

(21) Appl. No.: 12/865,256

(22) PCT Filed: Jun. 26, 2008

(86) PCT No.: PCT/EP2008/058180
§ 371 (c)(1),
(2), (4) Date: Aug. 23, 2010

(87) PCT Pub. No.: WO2009/095089
PCT Pub. Date: Aug. 6, 2009

(65) Prior Publication Data
US 2011/0013562 A1    Jan. 20, 2011

Related U.S. Application Data

(60) Provisional application No. 61/025,019, filed on Jan. 31, 2008.

(51) Int. Cl.
*G01R 31/08* (2006.01)
(52) U.S. Cl.
USPC .......................... 370/328; 370/252; 455/446
(58) Field of Classification Search
USPC ......... 370/252–253, 328–338, 312, 447–448, 370/462; 455/446
See application file for complete search history.

(56) References Cited

U.S. PATENT DOCUMENTS

2007/0286112 A1*  12/2007  Prakash et al. ................ 370/319
2008/0089287 A1*   4/2008  Sagfors et al. ................ 370/331

FOREIGN PATENT DOCUMENTS

| EP | 1845681 | * | 4/2006 |
| EP | 1845681 | A | 10/2007 |
| SE | EP1845681 | * | 10/2007 |

* cited by examiner

*Primary Examiner* — Ricky Ngo
*Assistant Examiner* — Iqbal Zaidi

(57) ABSTRACT

The present invention relates to a method for providing mobility to a mobile node capable packet based communication within a communications system via an access point. The method uses a signed session information package for allowing the mobile node to provide a further access point with information relating to the routing of a communications session so that the first access point can be used as an anchor point for the communications session even if the mobile node has changed its point of access to a further access point, wherein the communications session is a communications session between the mobile node and a corresponding node within a communications system. The signed session information package comprises routing information relating to the communications session and is signed by the first access point which is the access point via which the mobile node was communicating at the time of initiation of the communications session.

10 Claims, 8 Drawing Sheets

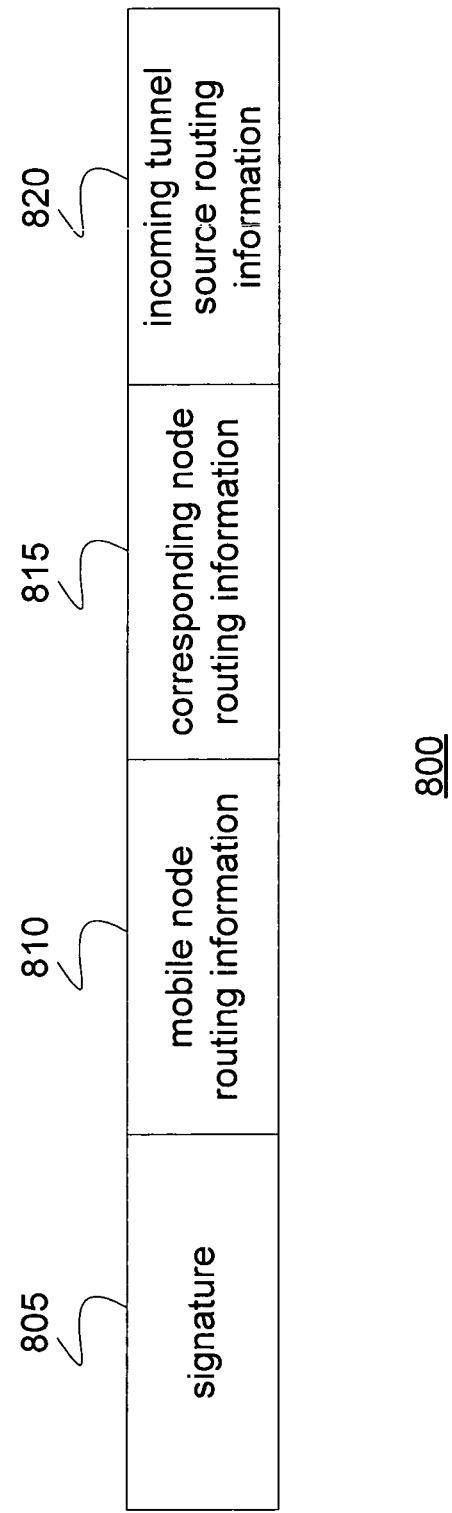

METHOD AND APPARATUS FOR PROVIDING MOBILITY TO A MOBILE NODE

This application claims the benefit of U.S. Provisional Application No. U.S. 61/025,019, filed Jan. 31, 2008, the disclosure of which is fully incorporated herein by reference.

TECHNICAL FIELD

The present invention relates to the field of data communication, and in particular to data communication by means of a mobile node.

BACKGROUND

Over the last years, the number of portable computers and other mobile nodes which support communication by means of the Internet Protocol (IP) has increased dramatically. Since continuous connectivity to IP based networks such as the Internet is generally desired by users of such mobile nodes, a lot of effort has been put into the issue of how to facilitate for roaming of a mobile IP node during ongoing communication sessions.

In order for a mobile node to be able to send a sequence of messages to a different node in an IP network and to receive a corresponding sequence of response messages, the IP address of the mobile node has to be fixed, at least during the duration of the message exchange. A contradictory requirement is on the other hand put on the IP address by the Routing mechanisms of the IP network, which require the point of attachment of a node to the IP network to be uniquely identified by an assigned IP address. Thus, when a mobile node moves to a new physical location, the Internet Routing mechanisms require the mobile node to change its IP address.

A solution to this seeming contradiction has been provided by the Internet Engineering Task Force (IETF) specification RFC 3344, "*IP Mobility Support for IPv4*".

According to RFC 3344, a mobile node is given a long-term IP address in a home network, and when a mobile node is away from its home network, a care-of address is associated with the mobile node. The care-of address reflects the mobile node's current point of attachment. A centrally located node in the home network, referred to as the Home Agent, maintains the home address as well as keeps track of any care-of address of the mobile nodes subscribing to services in the network serviced by the Home Agent. The Home Agent furthermore intercepts traffic and tunnels datagrams to any such mobile nodes that are currently roaming. If a mobile node changes its point of attachment while roaming, it must update the Home Agent in its home network with information on its new care-of-address. Hence, the solution provided by RFC 3344 provides for a Home Agent through which all communication to the mobile node has to be routed when the mobile node away from its home network. Although providing full mobility, the solution has several disadvantages, one being vulnerability, since all traffic to the mobile nodes subscribing to services within a particular network has to go through a single node—the Home Agent.

The problem of how to provide mobility to nodes communicating via the Internet Protocol has been addressed in other publications, such as the IETF draft: draft-levkowetz-netmob-protocol-00, "*Network-Based Localised Mobility Management Protocol*" dated Feb. 26, 2007. However, the solutions in these publications suffer from the same disadvantage of vulnerability as the solution provided in RFC 3344.

Hence, there is a desire to facilitate for mobility of nodes communicating via the Internet Protocol in a less vulnerable manner.

SUMMARY

An object of the present invention is to reduce the vulnerability of a communications system providing mobility to mobile nodes capable packet based communication within the system.

This object is achieved by a method for providing mobility to a mobile node capable of packet based communication with other nodes within a communications system via an access point. The method uses a signed session information package which comprises routing information relating to an communications session. The communications session is a communications session between the mobile node and a corresponding node within the system. The signed session information package is signed by a first access point which is the access point via which the mobile node could communicate with the other nodes at the time of initiation of the communications session. The signed session information package is used for allowing the mobile node to provide a further access point with information relating to the routing of the communications session so that the first access point can be used as an anchor point for the communications session even if the mobile node has changed its point of access to the further access point.

The object is also achieved by an access point for providing access to a communications system to nodes capable of packet based communication with other nodes in the communications system. The access point comprises a signed session information package handler connected to an interface. The signed session information package handler is arranged to generate a signed session information package comprising a signature of the access point as well as routing information relating to a communications session for which the access point should act as an anchor point. The signed session information package is further arranged to send, via the interface, the signed session information package to a mobile node which is party to the communications session to which the signed session information package relates. The access point further comprises a forwarding state handler arranged to store routing information relating to the communications session, and the access point is arranged to route datagrams relating to the communications session in accordance with the stored routing information.

The object is yet further achieved by a mobile node capable of communicating over the Internet Protocol with other nodes in a communications system via an access point. The mobile node comprises a session package receipt mechanism arranged to receive, from a first access point, a signed session information package comprising a signature of the first access point and routing information relating to a communications session in which the mobile node plays a part. The mobile node further comprises a data storage medium adapted to store the signed session information package; and a session package inform mechanism. The session package inform mechanism is arranged to send the signed session information package to a further access point as a request for the further access point to forward datagrams, which relate to the communications session and are sent from the mobile node, to the first access point.

An advantage of the invention is that the vulnerability of the communications system is reduced, since the mobile communication according to the invention does not rely on a single or small number of Home Agents for the routing of traffic, but rather, the anchor point task of routing communications sessions, and thereby the risk of communications failure, is distributed to a large number of access points within the communications system. Another advantage is that the amount of total transmission capacity used in the communications system for the transmission of a communications system is reduced, since the first access point, acting as an anchor point, is typically nearer to a further access point, to which the mobile node is currently attached, than an anchor point according to the prior art, i.e. a Home Agent, would be.

A further advantage achieved by the invention is that the scalability of the system to demands regarding the support of an increasing number of mobile nodes is greatly improved. In the prior art solution of having one Home Agent through which all communication to a mobile node has to be routed when the mobile node away from its home network, the support of an increasing number of mobile nodes is achieved by means of replacement of the one Home Agent to another Home Agent of higher capacity. By means of the invention, scaleability can instead be achieved by means of adding further (low-capacity) access points in a distributed manner.

The generation of the signed session information package can be triggered by the receipt, in the first access point, of a request for a signed session information package from the mobile node. Alternatively, the sending of the signed session information package is triggered by the receipt of a datagram of the communications session, the datagram being the nth datagram of the communications session, where n is a predefined number.

When the generation of the signed session information package is triggered by the receipt of a request from the mobile node, the session package receipt mechanism of the mobile node could advantageously be further arranged to check whether a signed session information package is desired in relation to a particular communications session, and to only generate a request for a signed session information package in relation to communications sessions for which a signed session information package is found to be desired. Hereby is achieved that less processing power (and hence normally less battery power) is required in the mobile node.

The method may comprise receiving, in the further access point, the signed session information package from the mobile node. The signature of the signed session information is verified, and if the verification so indicates, a request is sent to the first access point for forwarding of any datagrams received in relation to the communications session to the further access point. A forwarding state can then be set up in the further access point in accordance with the routing information in the signed session information package. The request for forwarding may be signed in order to increase the security of the communications system.

The method may comprise receiving a request from a further access point, wherein the request comprises a request that any datagrams relating to the communications session be forwarded to the further access point, and storing, in the first access point, routing information relating to the further access point in the forwarding state.

In order to facilitate for the mobile node to identify incoming datagrams as being part of the communications session after the mobile node has changed its point of attachment to a further access point, the mobile node could advantageously be assigned the same (private) IP address by the different access points providing access to the mobile node during the duration of the communications session. This could advantageously be achieved by use of a signed address information package comprising information on a preferred IP address and the signature of the node which initially assigned this IP address to the mobile node. The signed address information package could be carried by the mobile node from the initially IP address assigning node to the access point from which the assignment of the preferred IP address is desirable.

The object is further achieved by computer program products as defined in the claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 is an illustration of an example of a signed session information package.

ABBREVIATIONS

| AP | Access Point |
| --- | --- |
| DHCP | Dynamic Host Configuration Protocol |
| IETF | Internet Engineering Task Force |
| IP | Internet Protocol |
| NAT | Network Address Translator |
| OpenSSL | Open source Secure Sockets Layer |
| RFC | Request For Comments |
| TCP | Transmission Control Protocol |
| UDP | User Datagram Protocol |

DETAILED DESCRIPTION

Figure 1:
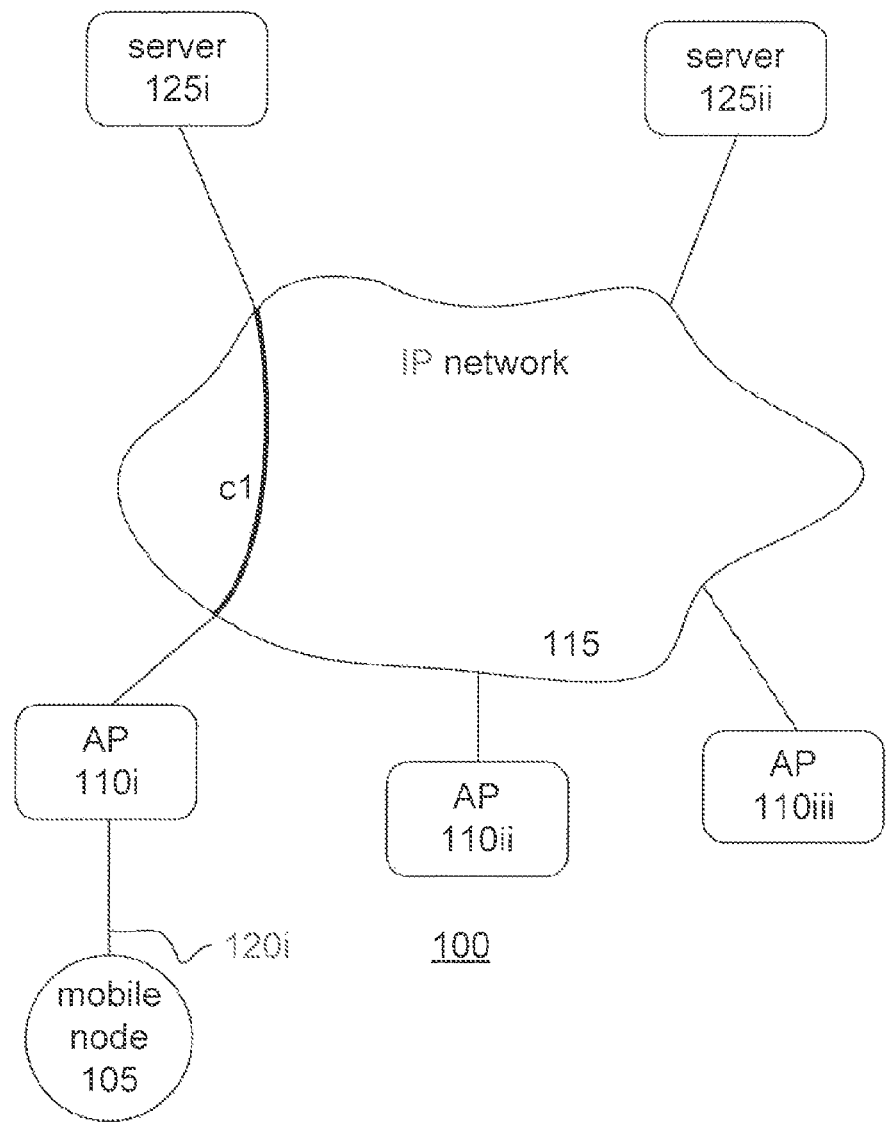
FIG. 1 is a schematic view of a communications system.

A communications system 100 wherein communication can occur between different nodes of the system 100 is schematically illustrated in FIG. 1. The system 100 comprises a large number of mobile nodes 105, of which one is shown in FIG. 1. The mobile nodes 105 are capable of communicating within system 100 via an Access Point (AP) 110. System 100 of FIG. 1 is further shown to comprise a plurality of Access Points 110, of which three different APs 110 have, for purposes of illustration, been denoted AP 110i, AP 110ii and AP 110iii, respectively. The Access Points 110 are connected to an Internet Protocol (IP) network 115, and provide access to the IP network 115 to mobile nodes 105. Communication between mobile nodes 105 and Access Points 110 generally occur over a wireless connection 120. The system 100 further comprises a plurality of servers 125, of which two, for purposes of illustration, have been denoted server 125i and server 125ii, respectively. For purposes of illustration, servers 125 and APs 110 have been shown to be separate to the IP network 115, although servers 125 and APs 110 are generally considered to form a part of IP network 115.

FIG. 1 illustrates a point in time when the mobile node 105 accesses the IP network 115 via AP 110$i$, and is involved in a communication session c1 with server 125$i$, wherein data is exchanged between the mobile node 105 and server 125$i$. At a later point in time, while the communication session is still ongoing, mobile node 105 may move into an area where AP 110$i$ can no longer provide access to IP network 115, for example into an area wherein access to the IP network 115 is provided by access point AP 110$ii$.

According to IETF specification RFC 3344 discussed above, "IP Mobility Support for IPv4", the communications session c1 would be tunnelled via a central relay point referred to as the Home Agent (not shown) when the mobile node 105 is located outside of its home network. When the mobile node 105 changes its point of attachment to the IP network 115 to a different access point 110, the mobile node 105 would have to inform the Home Agent of its new point of attachment. As discussed above, this solution, although providing full mobility, has the disadvantage of being vulnerable, since all traffic to the mobile nodes 105 subscribing to services within a particular network has to go through the Home Agent. Moreover, if the mobile node is located at a position far from the Home Agent, but close to one or more of the nodes with which it is communicating, the additional latency of the communication link caused by routing all traffic through the Home Agent can be significant. For instance, if the mobile node and the Home agent are on different continents, and the node with which the mobile node is in the same city, the direct link latency could be on the order of 1 ms, while the latency of traffic routed through the Home Agent could be on the order of 400 ms. This difference is significant for some classes of traffic, such as for instance voice conversations.

The invention provides a solution that overcomes the above disadvantages, while still providing full mobility of the mobile node 105.

According to the invention, mobility of the mobile node 105 will be achieved by using, as an anchor point for a communication session c, the access point 110 which the mobile node 105 used as its point of attachment to the network when the communication session c between the mobile node 105 and a corresponding node of system 100 was first initiated, so that any datagrams communicated between the mobile node 105 and the corresponding node would be relayed via the access point 110 to which the mobile node 105 was attached when the session was first initiated, regardless of whether or not the mobile node 105 has subsequently changed its point of attachment to another AP 110. This can be achieved in a reliable manner by providing the mobile node 105 with a signed session information package from the access point 110 to which the mobile node 105 was attached when communications session c was first initiated, so that the mobile node 105 may inform any subsequent access points 110 of the anchor point to be used for the ongoing communications session c, as well as any identifying parameters to be used in relation to the communications session c. The signed session information package could for example be in the form of a so called cookie. By anchor point is here meant a node with a stable IP address and stable presence in the internet routing system, which can forward traffic to a mobile node 105 as the mobile node 105 moves and changes it attachment point to the internet.

By signing the signed session information package with a signature of the node acting as anchor point, the security of the communications system is maintained, and by including the signature, the risk of hi-jacking of communications sessions is limited.

Figure 2:
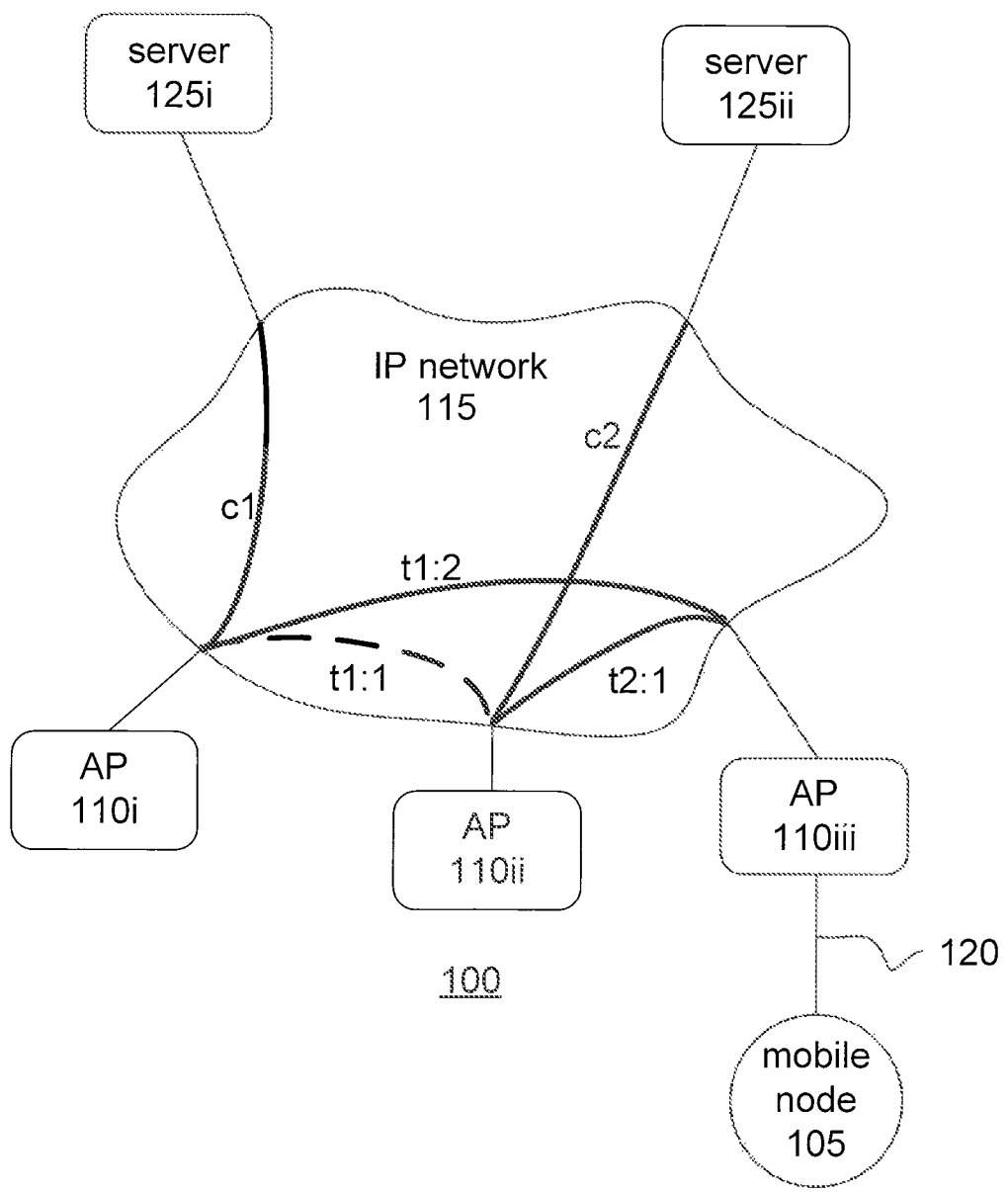
FIG. 2 is a further schematic view of a communications system at a different point in time.

FIG. 2 schematically illustrates the scenario in a system 100 wherein a mobile node 105 has changed its point of attachment to the IP network 115 from an AP 110$i$ at which a first communication session c1 was initiated, via an access point AP 110$ii$ at which a second communications session was initiated, to an access point AP 110$iii$. In accordance with the invention, the AP 110$i$ will act as an anchor point, or relay point, for the communications session c1, while AP 110$ii$ will act as an anchor point for the communications session c2. When the mobile node 105 changed its point of attachment to the access point AP 110$ii$, a communication tunnel t1:1 was set-up for the tunnelling of datagrams of communications session c1 between AP 110$i$ and AP 110$ii$. When the mobile node changed its point of attachment yet further to access point AP 110$iii$, communications tunnel t1:1 was torn down (as indicated by dashed lines in FIG. 2) and replaced by a communications tunnel t1:2 for tunnelling of datagrams belonging to communications session c1 between AP 110$i$ and AP 110$iii$. In relation to the communications session c2, a communications tunnel t2:1 was set up between AP 110$ii$ and AP 110$iii$ when the mobile node 105 changed its point of access to the access point AP 110$iii$. Different ongoing communications sessions could have different APs 110, or the same AP 110, as their anchor point.

Figure 3:
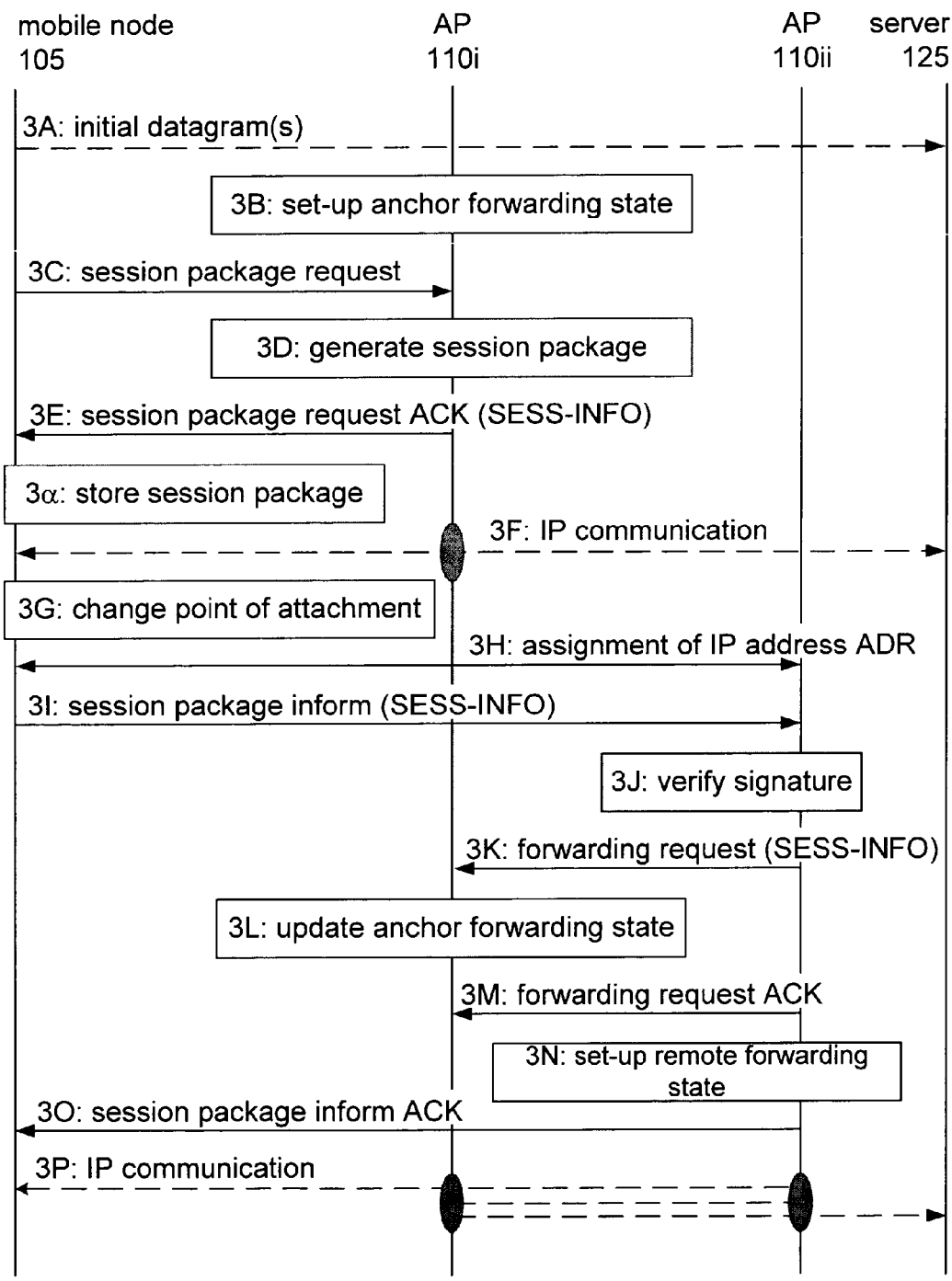
FIG. 3 is an example of a signalling diagram according to the invention.

FIG. 3 is a signalling diagram illustrating a signalling scenario according to an embodiment of the invention wherein signalling takes place between the mobile node 105, a first access point AP 110$i$ at which a communications session c is initiated, a second access point AP 110$ii$ to which the mobile node 105 subsequently changes its point of attachment to the IP network 115, and a server 125 with which the mobile node corresponds in communications session c1. It is assumed that the mobile node 105 has been provided with an IP address ADR1 prior to the start of the scenario of FIG. 3. In the signalling diagram of FIG. 3, signals comprising traffic data (transmitted in the traffic plane) are indicated by dashed arrows, while signals comprising control data (transmitted in the control plane) are indicated by solid arrows.

The mobile node 105 first initiates an IP communications session c with server 125 by sending at least one initial datagram 3A, to the server 125 via the first access point AP 110$i$. At the receipt of these datagram(s), first AP 110$i$ sets up an address translating state in a conventional manner, registering the IP addresses and ports of the source node (here the mobile node 105) and the destination node (here server 125) of the sending node and the receiving node. Typically, an AP 110 comprises a Network Address Translator (NAT) wherein the address translating state is set up, but other implementations could alternatively be used, such as the as the IPv6 NAT-PT mechanism defined in RFC 2766. Upon receipt of the initial datagram(s), first AP 110$i$ furthermore performs, at event 3B, the set up of a forwarding state relating to the communications session c. This forwarding state will in the following be referred to as an anchor forwarding state. If first AP 110$i$ uses a NAT for setting up an address translating state, the NAT could advantageously be extended to also set up the forwarding state of event 3B. However, the forwarding state set-up functionality could alternatively be separate to any NAT of AP 110$i$. An example of information that could be included in an anchor forwarding state is given in Table 1 and is further discussed below.

In the scenario of FIG. 3, the mobile node 105 then requests a signed session information package from the access point 110 which currently provides the mobile node 105 with access to the internet, i.e. to first AP 110$i$, in a session package request message 3C. This message could be sent any time after the transmission of the initial datagram(s) 3A. The sending of the signed package request 3C could advantageously have been preceded by the mobile node 105 determining that a signed session information package is likely to come in useful at a later point in time, for example by determining that the communications session c is a communications session which includes the exchange of more than a certain number of datagrams, and which therefore is likely to last for a long period of time, thereby having a considerable probability of lasting longer than the attachment of mobile node 105 to the IP network 115 via first AP 110$i$.

Upon receipt of the request 3C, AP 110$i$ generates a signed session information package at event 3D, and sends the signed session information package to the mobile node 105 in a session package request ACK message 3E (the signed session information package here being indicated as SESS-INFO). Upon receipt of message 3E, the mobile node 105 stores the signed session information package for future use at event 3 α. At 3F, the IP communication between the mobile node 105 and the server 125 continues (depending on when the signed session information package is generated, this communication can also occur before or during the events/messages denoted 3B-3α).

At event 3G, the mobile node 105 changes its point of attachment to a second access point AP 110$ii$. This change of the point of attachment is likely to occur at a later point in time, for example if the mobile node 110 moves to a new physical location during the duration of the communications session c. Upon changing its point of attachment, at event 3H, the mobile node 105 sends a request for an IP address to the second AP 110$i$, wherein the mobile node 105 requests the same IP address (ADR) from the second APii as it was previously using when accessing IP network 125 via the first AP 110$i$. The second AP 110$ii$ then checks if the allocation of the requested IP address would be possible, and if so, the requested IP address is allocated to the mobile node 105 at event 3H. An example of signalling by which the same IP address may be subsequently allocated to a mobile node 105 by different APs 110 is given in FIG. 4 below.

When having received the IP address from the AP 110$ii$ at event 3H, the mobile node 105 sends a session package inform message 3I to the second access point 110$ii$, where the message 3I comprises the signed session information package stored in the mobile node 105. Upon receipt of the session package inform message 3I, the second access point 110$ii$ verifies the signature of the signed session information package included in the message at event 3J. This verification could for example be performed according to a known verification/authentication technique, such as for instance OpenSSL signing and verification operations, or any other verification/authentication technique. The second AP 110$ii$ should preferably have a root certificate installed, which allows the second AP 110$ii$ to verify the certificate used by the first access point 110$i$ to sign the signed session information package. The second AP 110$ii$ can obtain the certificate of the first the first access point 110$i$ in a number of different ways: The certificate could be a part of the signature included in the signed session information package; the second AP 110$ii$ could send a request to a central Certificate Authority which issued the certificate (as seen below, the IP address of the first access point 110$i$ is advantageously included in the signed session information package); the second AP 110$ii$ could request the certificate from the first access point 110$i$, or the certificate of the first access point 110$i$ could have been pre-distributed to the second AP 110$ii$ (and other APs 110 in the system 100). The APs 110 in a system 100 should trust the same certificate authoriti(es), in order to be able to verify a signature. In the following, the term "verify" should be construed to refer to the verification of the signature in combination with a check of whether the certificate authority is trustworthy.

If the verification of the signature of the first AP 110$i$ proves the signature to be true and trustworthy, the second AP 110$ii$ sends a forwarding request message 3K to the first access point 110$i$, requesting the first AP 110$i$ to set up a tunnel t:1 for forwarding, to the second access point 110$ii$, of any datagrams sent from the server 125 to the mobile node 105. The forwarding request 3K advantageously includes the signed session information package and a further signature of the second access point 110$ii$. If the second AP 110$ii$ signs the forwarding request 3K sent to the first AP 110$i$, the first AP 110$i$ may verify that the request comes from a trustworthy source, and the risk of hi-jacking of communication session c is greatly reduced. Upon receipt of this forwarding request 3K, the first AP 110$i$ verifies the signature of AP 110$ii$ contained in the request, if any, and if this signature is proven to be true and trustworthy, AP 110$i$ updates the anchor forwarding state set-up at event 3L to include routing information of the second AP 110$ii$ included in the signed session information package of the forwarding request. AP 110$i$ then sends a forwarding request ACK message 3M to AP 110$ii$, which sets-up, at event 3N, a forwarding state for forwarding to the AP 110$i$ of any datagrams received from mobile node 105 relating to communications session c. This forwarding state will hereinafter be referred to as the remote forwarding state—"remote" as in remote from the anchor point. An example of information that could advantageously be included in a remote forwarding state is given in Table 1. The AP 110$ii$ then sends a signed package inform ACK message 3O to the mobile node 105. At 3P, IP communication can occur between mobile node 105 and server 125, via the access points 110$i$ and 110$ii$.

In the signalling scenario illustrated in FIG. 3, the mobile node 105 requests, in a message 3C, the first AP 110$i$ to send a signed session information package. Alternatively, the sending of a signed session information package from first AP 110$i$ to mobile node 105 can be initiated by the first AP 110$i$. An AP 110 could for example be arranged to automatically generate and send a signed information package to a mobile node 105 to which the AP 110 provides access to the IP network 115 upon detection of a new communications session c. However, the generation of a signed information session is typically rather processing-power-demanding, wherefore it is often more advantageous to let the generation of the signed information session be initiated by the mobile node 100, which generally has access to more information about the communications session c than the AP 110, and therefore can take a more informed decision regarding whether or not a signed session information package will be useful.

Event 3B of FIG. 3, where a forwarding state is set-up, could alternatively be performed at a later point in time than what is shown in FIG. 3, such as for example after the session package request ACK message 3E, or even later, but prior to the point in time when the mobile node 105 terminates its direct attachment to AP 110$i$. However, oftentimes, less processing power is required if the forwarding state is set-up at an early stage, when the AP 110$i$ has easy access to the parameters that define the communications session in relation to setting up of the address requesting state (as indicated in FIG. 3). Event 3B could advantageously be performed after the receipt of the $k^{th}$ datagram of the communications session, where k is for example 1 or 3.

In the scenario illustrated in FIG. 3, the corresponding node of communications session c is a server 125. In other scenarios, for which the signalling diagrams of FIG. 3 would also apply, the corresponding node could be another type of node, such as another mobile node 105. In the scenario of FIG. 3, the communications session c is initiated by the mobile node 105. A similar signalling diagram could be applied when a communications session c is initiated by a corresponding node.

If the mobile node 105 of FIG. 3 has more than one ongoing communications session for which the mobile node 105 has stored signed session information packages when changing its point of attachment to AP 110*ii*, the session package inform message 3I could advantageously include all such signed session information packages. Alternatively, one session package inform message 3I could be sent to the AP 110*ii* per ongoing communications session.

In event 3H of FIG. 3, the mobile node 110 requests the same IP address from AP 110*ii* as it had previously been assigned from AP 110*i* (and possibly by other APs 110 to which it has previously been attached). This is for example possible when AP 110*ii* comprises a NAT, which can use the same IP address space as any previous AP 110. The assignment of the same IP address from different APs 110 to which the mobile node 105 is attached during the duration of a communications session c facilitates for the mobile node 105 to identify to which communications session datagrams, transmitted to mobile node 105 as part of the communications session c, actually relate. For the same purpose, the mobile node 105 could advantageously also keep track of the number of the port used for the communications session c when attached to the AP 110*i*, so that datagrams address to this port number can be easily identified as belonging to the communications session c. An example of a method for subsequently assigning the same (private) IP address to a mobile node 105 by different APs 110 is discussed below in relation to FIG. 4.

Several of the message types of the signalling diagram in FIG. 3 are new: such as inter alia the session package request message 3C, the session package request ACK message 3E, the session package inform message 3I, the forwarding request message 3K, and various ACK messages. These new messages, forming a protocol for providing mobility to an IP-capable mobile node, could advantageously be transmitted over the User Datagram Protocol/Internet Protocol (UDP/IP), or other suitable protocol such as the Transmission Control Protocol/Internet Protocol (TCP/IP). The messages 3E and 3I, and advantageously also message 3K, include the signed session information package. In a version of this new protocol for providing mobility wherein the session package request message is not used, but the generation of the signed session information package is triggered by another event, a message corresponding to the session package request ACK message 3E would be included as a message being initiated by the access point 110, and a corresponding ACK message to be sent from the mobile node 105 would also be included.

The messages of the new protocol for providing mobility could be transmitted to a predefined port of the receiving node. Alternatively, other methods could be used for the sending and receiving nodes to agree on which port number to use for the transmission of the new messages.

Table 1 is an example of information stored in a forwarding state in an AP 110: The local IP address and port of the mobile node 105; the IP address and port of the corresponding node, e.g. server 125; the forwarding tunnel source IP address and port; the forwarding tunnel destination IP address and port; and an indication of forwarding state. The outgoing and anchor forwarding state could both advantageously include the information given in Table 1—wherein the tunnel source IP address and port of the remote forwarding state would take the same value as the tunnel destination IP address and port of the anchor forwarding state, and vice versa. The forwarding state indicator indicates whether the forwarding state is active or not, and could for example be a flag that is set when the forwarding state is activated. The forwarding state indicator could be omitted in the remote forwarding state in an implementation where the remote forwarding state is only set-up upon activation of the forwarding state. Further information could also be included in the forwarding state, if desired. For example, an indication of whether the access point 110 in which the forwarding state is stored acts as an anchor point for the communications session to which the forwarding state relates could be included.

TABLE 1

An example of information stored in a forwarding state.

| | |
|---|---|
| a. | local IP address of mobile node 105 |
| b. | port number of mobile node 105 |
| c. | IP address of corresponding node |
| d. | port of corresponding node |
| e. | tunnel source IP address for forwarding |
| f. | tunnel source port for forwarding |
| g. | tunnel destination address IP for forwarding |
| h. | tunnel destination port for forwarding |
| i. | Forwarding state indicator |

Figure 4:
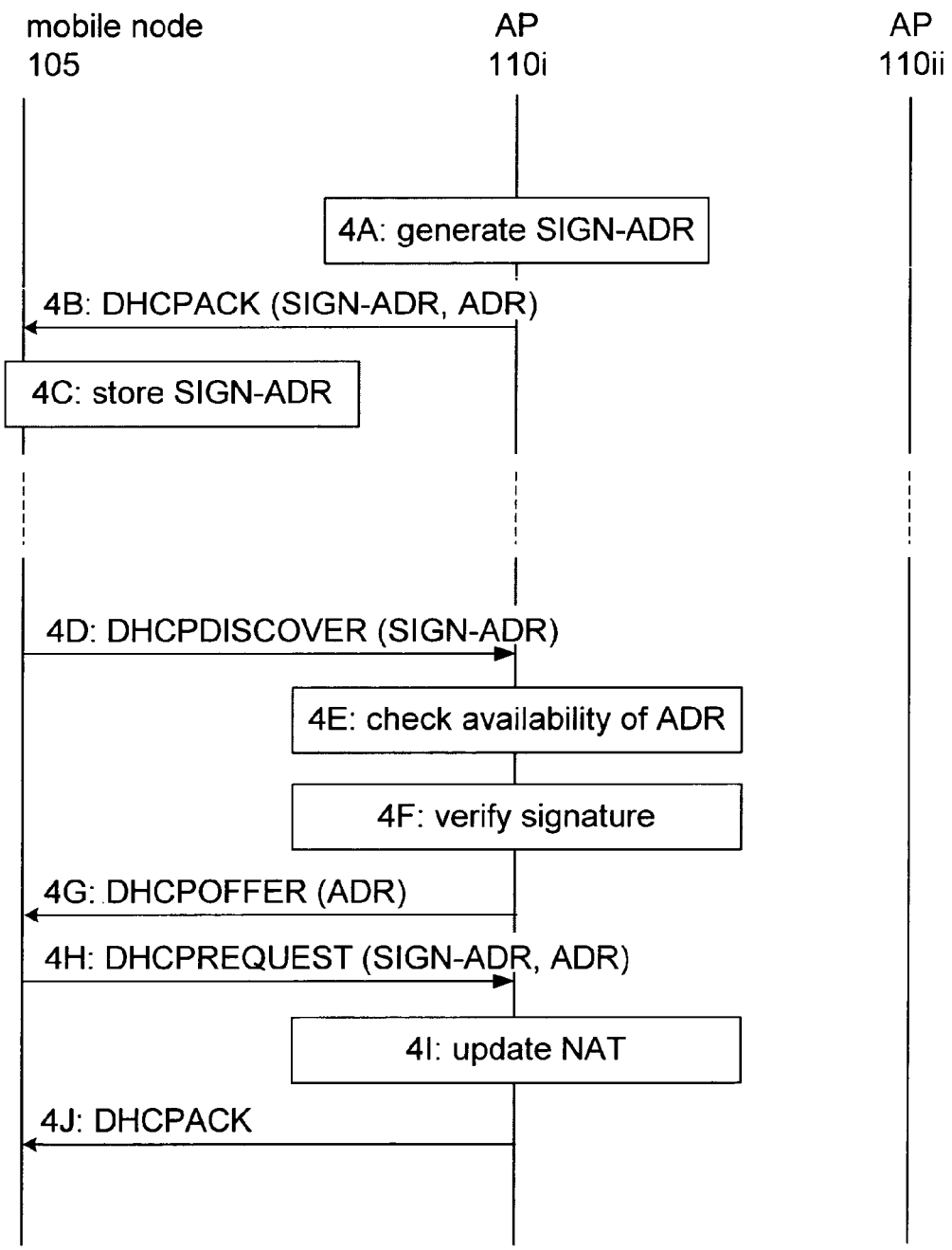
FIG. 4 is an example of a signalling diagram of an aspect of the invention.

An example of signalling that could occur between the APs 110 and the mobile node 105 in order to allow for the mobile node 105 to subsequently be assigned the same private IP address by two different APs 110 is illustrated in FIG. 4. The signalling diagram of FIG. 4 is given as an example only, and a further discussion on how to allow for the subsequent allocation of the same IP address is given in the International Application "*Method and apparatus for the allocation of parameter values in a communication system*", filed by the same applicant on the same day.

The signalling diagram of FIG. 4 is applicable to a scenario where the mobile node 105 and the APs 110 are capable of signalling according to the Dynamic Host Configuration Protocol (DHCP), and where the second AP 110*ii* comprises a NAT. Similar signalling diagrams could be applied in other scenarios. The signalling of FIG. 4 starts at a point in time when the mobile node 105 accesses the IP network 115 via AP 110*i*, and has requested an IP address from a first AP 110*i*. The first AP 110*i* generates, at event 4A, a signed address information package, SIGN-ADR, comprising a signature of the first AP 110*i*, as well as information on the IP address allocated to the mobile node 105 by the first AP 110*i*. The signed address information package, SIGN-ADR, may also comprise further information, such as the IP address of the first AP 110*i*. The signed address information package, SIGN-ADR, is then transmitted to the mobile node 105 in a DHCPACK message 4B. The value of the allocated IP address, ADR, may also advantageously be included in DHCPACK message 4B. At event 4C, the mobile node stores the signed address information package SIGN-ADR for future use.

At a later point in time, the mobile node 110*i* tries to access the IP network 115 via a second AP 110*ii*, by sending to the second AP 110*ii* a DHCPDISCOVER message 4D including the signed address information package (the flow of time having been indicated by broken time lines in FIG. 4). Upon receipt of the DHCPDISCOVER message 4D, the second AP 110*ii* checks whether the requested IP address ADR is available for allocation to the mobile node 105 at event 4E. If so, the second AP 110*ii* verifies the signature at event 4F, e.g. in the same way as the verification of the signature of the signed session information package information, SESS-INFO. If the second AP 110*ii* finds the signature of the signed address information package to be true and trustworthy, the second AP 110ii offers the requested IP address ADR to the mobile node 105 in a DHCPOFFER message 4G. The mobile node 105 then sends a DHCPREQUEST message 4H to the access point 110ii to confirm the request. The AP 110ii updates its NAT in order to reflect the allocation of IP address ADR to mobile node 105 at event 41, and sends a confirmation of the allocation to the mobile node in DHCPACK message 4J. The signed address information package could advantageously be included in a client identifier option (option 61 as defined in the IETF RFC 2132) of the DHCPDISCOVER message 4D or the DHCPREQUEST MESSAGE. In FIG. 4, the signed address information package is shown to be included in both message 4D and 4H, but the inclusion of the signed address information package in one message from the mobile node 105 to the AP 110ii would be sufficient.

In FIG. 4, the messages/events 4D-4J correspond to the event 3H, allocation of IP address, of FIG. 3. The signalling diagram of FIG. 4 is given as an example only, in order to illustrate a method of allowing a particular IP address to be subsequently assigned to the same mobile node 105 by more than one AP 110 by allowing for a signed address information package to be conveyed, from the AP 110 which initially assigned the particular IP address to the mobile node 105, to other APs 110 in the system 100, via the mobile node 105. The signalling diagram of FIG. 4 can be modified in many ways, as is further discussed in the above mentioned international application by the same applicant.

Figure 5:
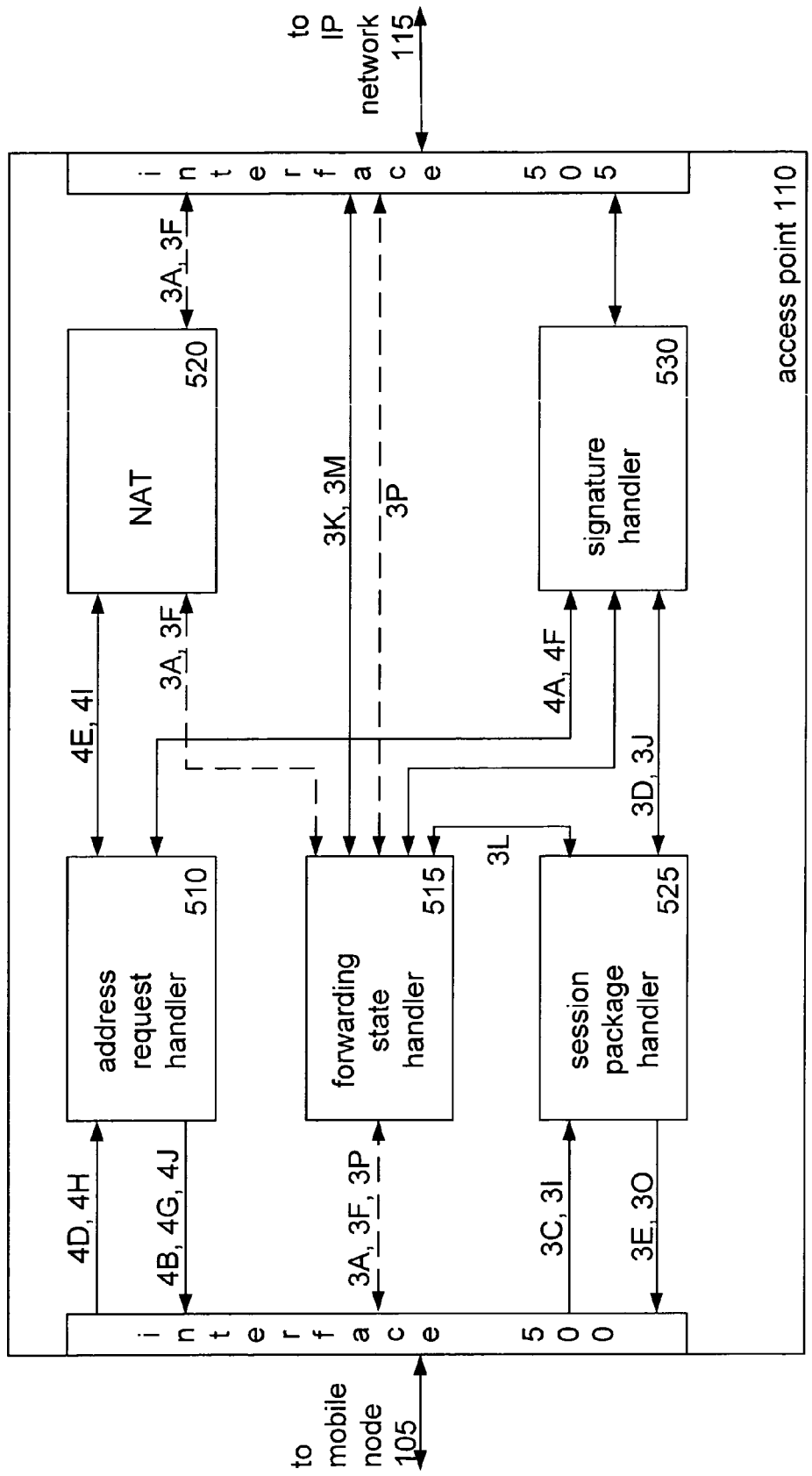
FIG. 5 is a schematic illustration of an example of an access point according to the invention.

FIG. 5 schematically illustrates an example of an access point 110 according to the invention. As in FIG. 3, connections in the signalling plane are indicated by solid lines, while connections in the traffic plane are indicated by dashed lines (the separation of signalling and traffic planes may be physical, or logical only).

Access point 110 of FIG. 5 comprises an interface 500 for communicating with a mobile node 105, and an interface 505 for communicating with other nodes of system 100. Interface 500 and 505 could be the same physical interface, but have been separated in FIG. 5 for illustrative purposes. Access point 110 furthermore comprises an address request handler 510, a forwarding state handler 515, a NAT 520, a signed session information package handler 525, and a signature handler 530.

The address request handler 510 is connected to interface 500, and arranged to handle requests for a particular IP address from a mobile node (cf. event 3H of FIG. 3, as well as events/messages 4A-4J of FIG. 4). The address request handler 510 could typically be a DHCP server. The address request handler 510 is connected to the signature handler 530, in order to be able to sign signed address information packages to send to a mobile node 105 (cf. events 4A of FIG. 4), and to be able to verify a signature of a received signed address information package (cf. event 4F of FIG. 4). Address request handler 510 is further connected to NAT 520 in order to check availability of a requested IP address (cf. event 4E of FIG. 4). The invention may also be applied to access points 110 using other types of IP address allocation functionality than the stateful address allocation mechanism described above, such as a stateless address auto-configuration functionality mechanism being standardised for IPv6.

Forwarding state handler 515 of FIG. 5 is connected to interface 500, as well as to interface 505, the NAT 520, the signature handler 530 and the signed session information package handler 525. Forwarding state handler 515 is arranged to receive traffic from/to the mobile node 105. The forwarding state handler 515 can advantageously keep a forwarding state register/database, where information relating to communications sessions, currently administrated by the access point 110, is kept. Table 1 provides an example of information stored in such forwarding state register/database in relation to one session. The forwarding state handler 515 is arranged to forward traffic from a mobile node 105 received via interface 500 to the NAT 520 if the forwarding state indicator (row i. of table 1) indicates that the forwarding state is not activated, and to another access point 110 according to the forwarding state register/database (rows g. and h. of Table 1) if the forwarding state indicator indicates that the forwarding state is activated. Traffic to the mobile node 105 from other nodes in system 100 will reach the forwarding state handler 515 via the NAT 520. The forwarding state handler 515 is arranged to convey such traffic to a mobile node 105 according to address information in the NAT 520 if the forwarding state of the session in the forwarding state register/database is indicated as inactive, while traffic relating to a session for which the forwarding state has been activated, the forwarding state handler 515 will forward the incoming traffic to another access point 110 in accordance with information stored in the forwarding state register/database. Forwarding state handler 515 is further arranged to update the forwarding state register/database when a mobile node 105, for which there is at least one ongoing session, moves to, or away from, the access point 515, and to exchange signalling with other access points 110 of system 100 in order to request a forwarding state or receive a request for a forwarding state (cf. messages/events 3K-3N of FIG. 3).

In an embodiment of the invention where a forwarding request message 3K is signed by the requesting AP 110, the forwarding state handler 515 is further connected to the signature handler 530, in order to allow for the signing of any forwarding requests 3K to be sent, and for the verification of any forwarding requests 3K received.

The forwarding state handler 515 of FIG. 5 is also connected to the signed session information package handler 525. The signed session information package handler 525 is further connected to the interface 500 and to the signature handler 530. The signed session information package handler 525 is arranged to receive any signed session package inform messages (cf. message 3I of FIG. 3), and to verify the signature of any signed session information packages contained in such messages. The signed session information package handler 525 is also arranged to inform the forwarding state handler 515 of any received signed session information packages for which the signature has been proven to be true and trustworthy. The signed session information package handler 525 is further arranged to generate signed session information packages and transmit such packages to the relevant mobile node 105, when required. Depending on the implementation of the invention, the signed session information package handler 525 may be arranged to generate a signed session information package upon request from a mobile node 105 (cf. FIG. 3), or upon request from the forwarding state handler 515, as discussed in relation to FIG. 3.

FIG. 5 illustrates an access point 110 wherein the IP address translation is administrated by a NAT 520. The NAT 520 and the forwarding state handler 515 have been shown to be separate units. However, the forwarding state handler 515 may advantageously, at least on part, be implemented as an extension of a conventional NAT.

Figure 6:
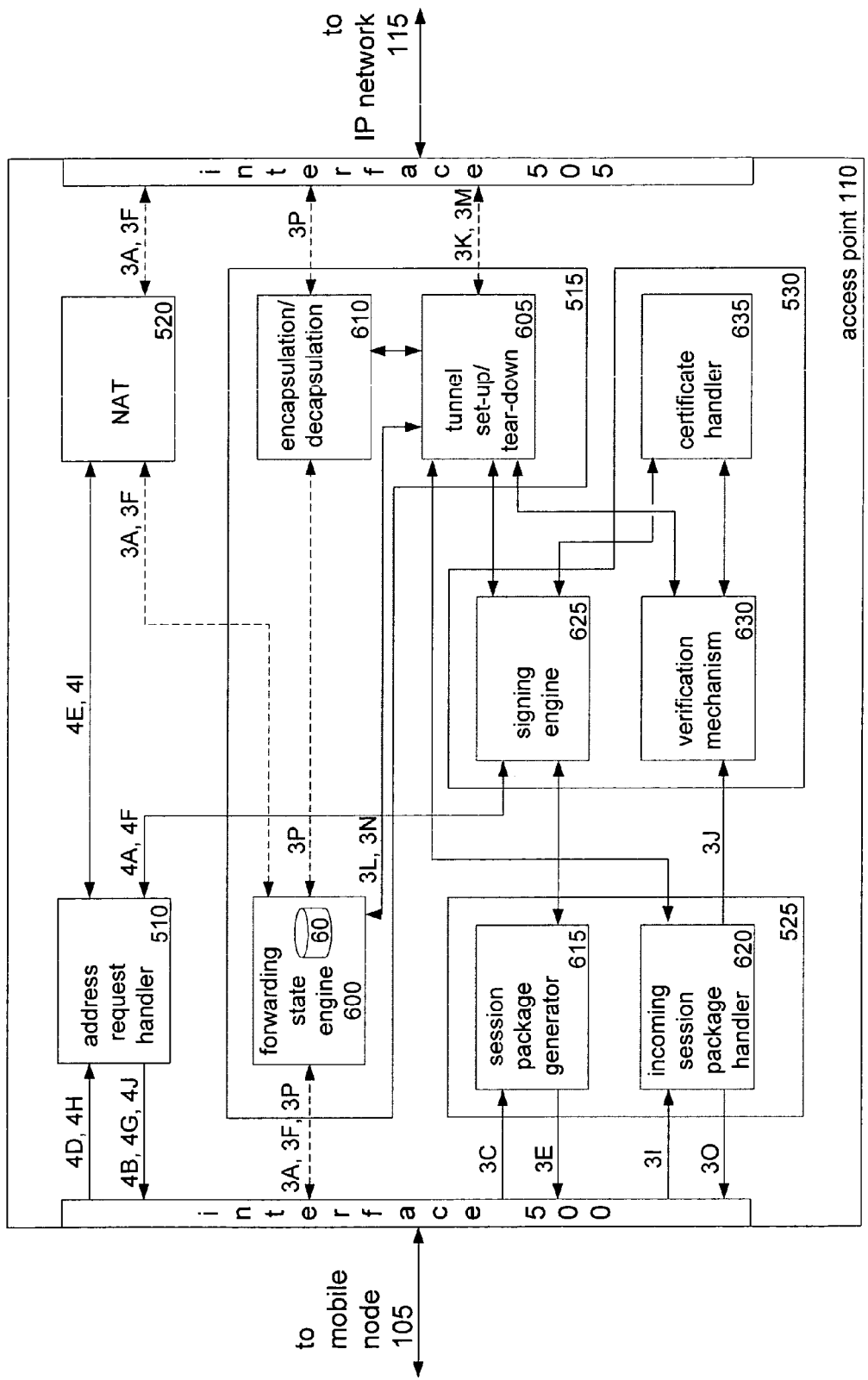
FIG. 6 is another schematic illustration of an example of an access point according to the invention.

An example of an implementation of the access point 110 of FIG. 5 is shown in greater detail in FIG. 6. FIG. 6 further illustrates an example of signalling that may occur to, from and within the access point 110, with references to the messages/events of FIG. 3.

The forwarding state handler 515 of FIG. 6 is shown to include three subunits: a forwarding state engine 600, a tunnel set-up/tear-down mechanism 605 and an encapsulation/de-capsulation mechanism 610. The signed session information package handler 525 of FIG. 6 is shown to include a session package generator 615 and an incoming signed session information package handler 620. The signature handler 530 of FIG. 6 is shown to include a signing engine 625, a verification mechanism 630 and a certificate handler 635.

The forwarding state engine 600 is arranged to communicate traffic to/from the mobile node 105 (cf. signals 3A, 3F and 3P of FIG. 3). The forwarding state engine 600 comprises a forwarding state register/database 60 as well as mechanisms for keeping this register/database updated. Forwarding state engine 600 is further arranged to communicate traffic to be forwarded to other access points 110 to encapsulation/decapsulation mechanism 610, while traffic relating to a mobile node 105 which is attached to access point 110 will be relayed by forwarding state engine 600 to/from the NAT 620 from/to the mobile node 105. Forwarding state engine 600 is further arranged to receive information relating to changes in the current forwarding states from the tunnel set-up/tear-down mechanism 605, and to update the forwarding state register/database 60 accordingly. Forwarding state engine 600 may further advantageously be connected to the incoming signed session information package handler 620, in order for the incoming signed session information package handler 620 to communicate information contained in an incoming session package inform message 3I to the forwarding state engine 600, which may then update the forwarding state register/database 60 accordingly.

Tunnel set-up/tear-down mechanism 605 of forwarding state handler 515 is arranged to communicate with other access points 110 of system 100 relating to forwarding tunnels that should be set-up or torn down as mobile nodes 105, being involved in ongoing communications sessions, move through the system 100. Tunnel set-up/tear-down mechanism 605 can advantageously further be arranged to communicate, when an ongoing communications session has been discontinued for which the tunnel set-up/tear-down mechanism 605 has requested a forwarding state in another access point 110, to the another access point 110 that the tunnel relating to this communications session should be torn down. In addition, the tunnel set-up/tear-down mechanism 605 could advantageously be arranged to inform another access point 110, which has requested a forwarding state in the access point 110 in relation to a communications sessions for which the access point 110 is acting as an anchor point, when the communications session has moved to a further access point 110 (cf. FIG. 2, where communications session c1 has moved from access point 110*ii* to access point 110*iii*). Tunnel set-up/tear-down mechanism 605 is further advantageously arranged to tear down any forwarding states in access point 110, when appropriate, such as for example upon receipt of an instruction to do so from another access point 110, or upon detection that a mobile node having a communications session for which the access point 110 does not serve as an anchor point has left the access point 110.

Tunnel set-up/tear-down mechanism 605 is connected to forwarding state engine 600, in order to be able to update the forwarding state engine 600 on events that influence the forwarding state of a communications session, such as for example the receipt of a forwarding request message 3K from another access point 110. Upon receipt of such forwarding request message 3K, the tunnel set-up/tear-down mechanism 605 sends a request for an update of the forwarding state of the communications session to the forwarding state engine.

In an implementation of the invention wherein a forwarding request message 3K comprises a signature of the access point 110 that sends the message, the tunnel set-up/tear-down mechanism 605 should preferably be connected to the signing engine 625 for signing of any outgoing forwarding request messages 3K, as well as to the verification mechanism 630 for verification of the signature of any incoming forwarding request messages 3K.

Encapsulation/de-capsulation mechanism 610 is arranged to encapsulate/de-capsulate traffic being transmitted to/from other access points 110 in accordance with instructions received from the tunnel set-up/tear-down mechanism 605.

The session package generator 615 of signed session information package handler 525 of FIG. 6 is arranged to generate and transmit, to a mobile node 105 for which a communications session has been initiated via the access point 110, a signed session information package comprising information relating to the initiated session. In order to be able to sign the signed session information package, the session package generator 615 is connected to the signing engine 625. The session package generator 615 can be arranged to generate and transmit a signed session information package for all communications sessions initiated via the access point 110, or upon the occurrence of a triggering event—the session package generator could for example be arranged to generate the signed session information package upon the triggering event of receipt of a session package request message 3C, or upon the triggering event of the nth datagram of a communications session having been received in the access point 110, where n is a predefined number (the nth datagram of the communications session could be defined as the nth datagram in a particular direction of the communications session, or the nth datagram of the total communication that reaches the access point 110).

The incoming signed session information package handler 620 of FIG. 6 is arranged to receive session package inform messages 3I, and to act upon such messages. For example, incoming signed session information package handler 620 is connected to verification mechanism 630 in order to be able to verify the signature of a signed session information package received in a session package inform message 3I. The incoming signed session information package handler 620 is further connected to the forwarding state engine 600 (possibly via the tunnel set-up/tear-down mechanism 605) in order to allow for the set-up of a forwarding state (cf. event 3K-3N of FIG. 3) in response to the receipt of a session inform message 3I.

The signing engine 625 of signature handler 520 of FIG. 6 is arranged to generate a signature of the access point 530 for signing of information to be transmitted to other nodes, such as signed session information packages, signed address information packages, forwarding request messages 3K, etc. The signing engine 625 of FIG. 6 is connected to the certificate handler 635 which handles certificates used for signing, as well as certificates used for verification of signatures. The verification mechanism 630 of signature handler 530 of FIG. 6 is arranged to verify signatures of other nodes in the system 100, such as other access points 110, and can advantageously also be connected to the certificate handler 635.

The access point 110 of FIG. 6 is given as an illustrative example, and may be modified in many ways. For example, the address request handler 510 could be omitted from access point 110, and the address allocation could instead be performed by an external address request handler. Similarly, the NAT 520 could be omitted, and the address translating state could be set-up externally to the access point 110. At least a part of the certificate handler 635 used for storing of certificates could also be omitted from access point 110 and certificates could be stored externally to the access point 635.

Figure 7:
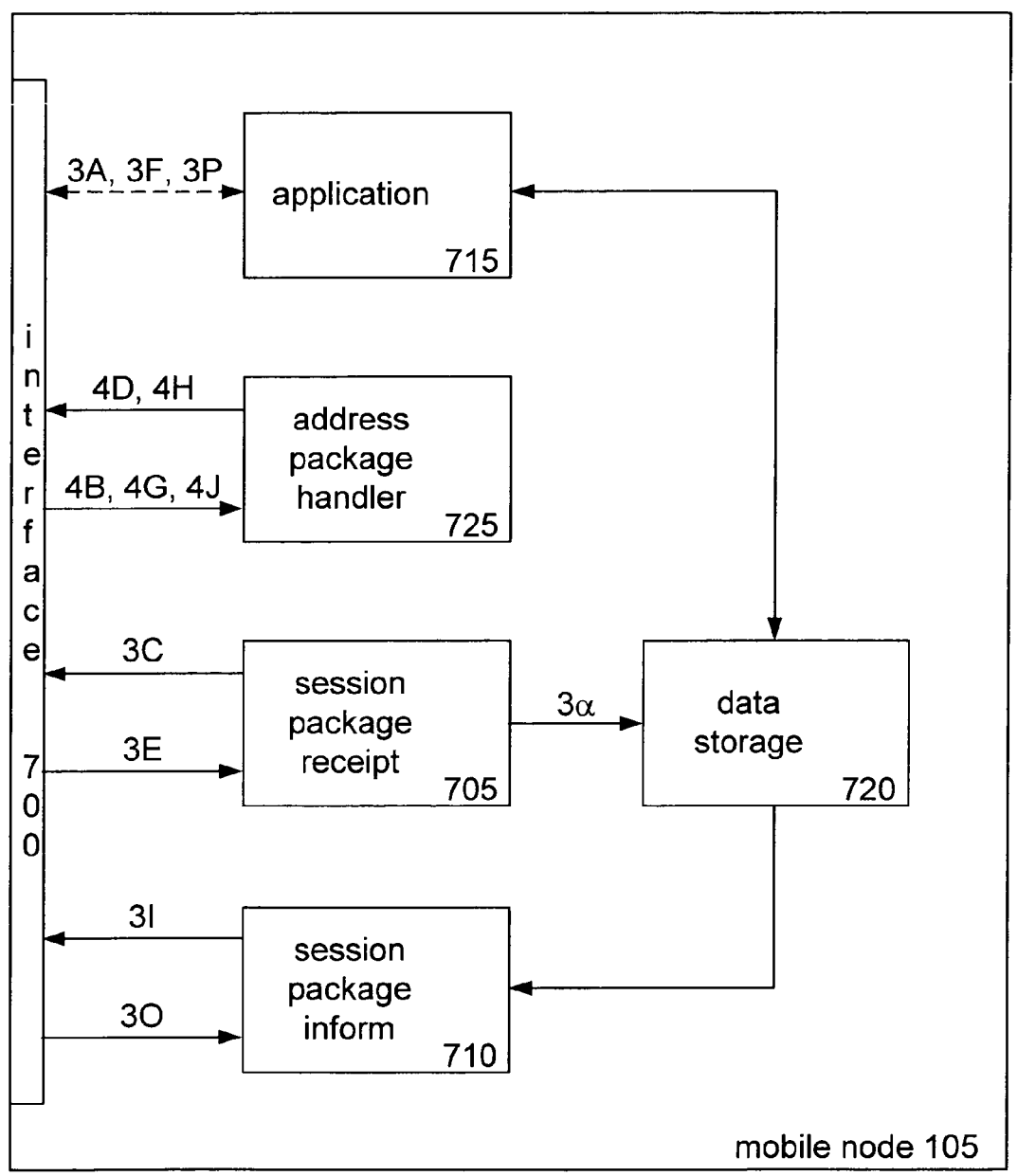
FIG. 7 is a schematic illustration of an example of a mobile node according to the invention.

FIG. 7 is a schematic illustration of a mobile node 105 according to the invention, wherein. signals and events of FIG. 3 have been indicated. Mobile node 105 of FIG. 7 comprises an interface 700 for receipt and transmission of signals from/to an access point 110. To interface 700 are connected a session package receipt mechanism 705, a session package inform mechanism 710 and an application 715. As shown in FIG. 7, the mobile node 105 may advantageously further comprise an address package handler 725. A data storage medium 720 adapted to store at least one signed session information package is connected to the session package request mechanism 705, as well as to the session package inform mechanism 710 and the address package handler 725.

The session package receipt mechanism 705 is arranged to receive a message comprising a signed session information package (cf. session package request ACK message 3E of FIG. 3). The session package receipt mechanism 705 is further arranged to retrieve the signed session information package from a received message containing a signed session information package, and store the signed session information package in the data storage medium 720. In an embodiment of the invention where the transmission of a signed session information package from an access point 110 to the mobile node 105 is triggered by a session package request (cf. message 3C of FIG. 3) sent by the mobile node 105, the session package receipt mechanism 705 is further arranged to generate and send the session package request to the relevant access point 705. In this embodiment, the session package receipt mechanism is advantageously arranged to request a signed session information package only from the access point 110 to which the mobile node 105 was attached when the communications session in relation to which the signed session information package relates was initiated. Moreover, in this embodiment, the session package receipt mechanism 705 could advantageously comprise a mechanism for checking whether a signed session information package is desired in relation to a particular session, and to only generate session package requests in relation to communications sessions for which a signed session information package is desired. A signed session information package would typically be desired for long-lasting communications sessions, likely to last long enough for the mobile node 105 to change its point of attachment during the duration of the communications session. Hence, the check of whether a signed session information package is desired could for example include a check as to whether the application 715 of the mobile node 105 that is involved in the communications session is an application 715 for which communications sessions are typically long-lasting.

The session package inform mechanism 710 is arranged to transmit, when the point of attachment to the IP network 125 changes from a first access point 110 to a second access point 110, a session package inform message 3I to the second access point 110. In doing so, the session package inform mechanism 710 is arranged to retrieve any signed session information packages stored in the data storage medium 720, and include the signed session information package(s) in the session package inform message 3I. Typically, the second access point 110 would send a session package inform ACK message 3O in response to the receipt of the session package inform message 3I (cf. FIG. 3). The session package receipt mechanism 705 could advantageously be arranged to monitor whether such session package inform ACK message 3O has been received, and to take appropriate action if no such ACK message 3O is received within a predetermined period of time after the session package inform message 3I has been transmitted. Such action could for example be to re-send the session package inform message 3I, to search for a different access point 110 that could be utilised for accessing the IP network 125, or to issue a message at the user interface of the mobile node 105 informing the user of the mobile node 105 of the unsuccessful request for continued transmission of the ongoing communications session(s) via the second AP 110.

Also indicated in FIG. 7 is an application 715 of the mobile node 105, to and from which IP traffic of the session to which the signed session information package(s) relate is transmitted. Oftentimes, the mobile node 105 comprises several applications, of which one or more may be active at the same time.

The data storage 720 of FIG. 7 is arranged to store at least one signed session information package, and preferably arranged to store a plurality of signed session information packages, since a mobile node 105 often has several active communications sessions simultaneously. Since different communications sessions may have been initiated while the mobile node 105 was attached to the IP network 125 via different access points 110, the routing information in different signed session information packages stored in data storage medium 720 is not necessarily the same.

Mobile node 105 of FIG. 7 further includes an address package handler 725, arranged to receive a signed address information package from an access point 110 (cf. messages 4B, FIG. 4), and to store the signed address information package in a data storage medium, which could for example be the data storage medium 720 arranged to store the signed session information package 720. The address package handler 725 could further be arranged to include the stored signed address information package in messages transmitted by the mobile node 105 (cf. e.g. messages 4D and 4H of FIG. 4)—or, alternatively, this task could be performed by other mechanisms of mobile node 105. In an implementation of the address assignment wherein the mobile node 105 actively requests a signed address information package from an access point 110 when desired, the address package handler could advantageously be further arranged to generate and transmit a request for a signed address information package.

The data storage medium 720 of FIG. 7 could hence advantageously be further arranged to store a signed address information package as discussed above. Alternatively, the signed address information package could be stored in a separate data storage medium.

FIG. 8 illustrates an example of a signed session information package 800. The signed session information package 800 includes a signature field 805 for carrying a signature of the access point 110 acting as an anchor point for the communications session to which the communications session relates. The signed session information package 800 further advantageously comprises a mobile node routing information field 810 comprising information on the local (private) IP address and port number used by the mobile node 105 for the communications session, a corresponding node routing information field 815 comprising information on the IP address and port number used by the corresponding node for the communications session, and an incoming tunnel source routing information field 820 comprising information on the IP address and port number to be used by a further node for forwarding of any datagrams relating to the communications session received from the mobile node. In FIG. 8, some data fields have been illustrated to include both an IP address and a port number of a node. The signed session information package could optionally include further information.

The mobile node 105 could be any mobile device capable of data communication, such as a laptop computer, a smartphone (a mobile phone with applications designed to connect to the internet), a sip-phone (a wireless phone designed to use the SIP protocol to set up and maintain VoIP phone calls), a small computer of the type called MID (Mobile Internet Device), an internet-connected navigation device, an internet-connected gaming console, etc. The access point 110 could be any node providing access to an IP network 115 to a mobile node, such as WiFi router, a blue-tooth router, a cellular network radio base station, a cellular network radio base station controller, etc..

Mobile node 105 and access point 110 comprise data processing means, and the address request handler 510, the forwarding state handler 515, the NAT 520, the signed session information package handler 525, and the signature handler 530, as well as the session package receipt mechanism 705, the session package inform mechanism 710, the application 715 and the address package handler 725 are advantageously implemented as a suitable combination of hardware and software.

In the above, the invention has been described in terms of communication by means of the Internet Protocol. However, the invention could be applied to a system providing communication by means of any packed based communications protocol.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A method for providing mobility to a mobile node within a packet based communications system, the method comprising:
    initiating a communication session between the mobile node and a corresponding node via a first access point providing a point of attachment;
    receiving in the mobile node from the first access point, a signed session information package comprising routing information relating to the communications session and being signed by the first access point changing by the mobile node, the point of attachment from the first access point to a further access point;
    sending the signed information package from the mobile node to the further access point;
    sending from the further access point to the first access point, a forwarding request message requesting the first access point to forward to the further access point any datagrams sent from the corresponding node to the mobile node;
    sending and receiving datagrams between the mobile node and the corresponding node via the further access point and the first access point acting as an anchor point for the communication session, wherein the sending an receiving datagrams further includes establishing by the first access point, a tunnel to the further access point; and
    tearing down the tunnel to the further access point and establishing by the first access point, a second tunnel to a second further access point upon receiving a second forwarding request message from the second further access point and upon verifying a signature of the second further access point contained in the second forwarding request message.

2. The method of claim 1, further comprising generating, in the first access point, the signed session information package.

3. The method of claim 1, wherein the first access point sends the signed session information package to the mobile node upon receipt of a request for the signed session information package from the mobile node.

4. The method of claim 1, wherein the first access point sends the signed session information package to the mobile node upon receipt of a datagram of the communications session, the datagram being the nth datagram of the communications session, where n is a predefined integer.

5. The method of claim 1, wherein the step of initiating the communication session includes setting-up a forwarding state in the first access point by storing routing information relating to the communications session.

6. The method of claim 1, further comprising upon receiving, in the further access point, the signed session information package from the mobile node:
    verifying the signature of the first access point and, only if the signature is true:
    sending the forwarding request message to the first access point; and
    setting up a forwarding state in the further access point in accordance the routing information in the signed session information package.

7. The method of claim 6 further comprising:
    receiving, in the further access point from the mobile node, a signed address information package comprising information on a preferred IP address and a signature of an IP-address assigning node having assigned the preferred IP address to the mobile node at a previous point in time;
    verifying the signature of the IP-address assigning node; and
    when the IP-address assigning node is trustworthy, assigning the preferred IP address to the mobile node.

8. The method of claim 1, further comprising:
    receiving, in the mobile node, a signed address information package from an IP address assigning node, wherein the signed address information package comprises information on an IP address having been assigned to the mobile node by the IP address assigning node; and
    sending the signed address information package to the further access point in order to request the IP address contained in the signed address information package.

9. A first access point for providing access to a communications system to mobile nodes capable of packet based communication with other nodes in the communications system, the first access point comprising:
    a signed session information package handler connected to an interface and being configured to:
        generate a signed session information package comprising a signature of the first access point and routing information relating to a communications session for which the first access point should act as an anchor point; and
        send, via the interface, the signed session information package to a mobile node being party to the communications session to which the signed session information package relates; and
    a forwarding state handler configured to:
        store the routing information relating to the communications session;
        receive from a further access point, a forwarding request message requesting the first access point to forward to the further access point any datagrams sent from a corresponding node to the mobile node; and
        establish a tunnel to the further access point for forwarding datagrams relating to the communication session;
    wherein the first access point is configured to route datagrams relating to the communications session in accordance with the stored routing information, and wherein the forwarding state handler is further configured to tear down the tunnel to the further access point and establish a second tunnel to a second further access point upon receiving a second forwarding request message from the second further access point and verifying a signature of the second further access point contained in the second forwarding request message.

10. The first access point of claim 9, further comprising:
a signature handler connected to the signed session information package handler and being configured to verify whether the second further access point is trustworthy.

* * * * *

UNITED STATES PATENT AND TRADEMARK OFFICE
CERTIFICATE OF CORRECTION

PATENT NO. : 8,542,634 B2
APPLICATION NO. : 12/865256
DATED : September 24, 2013
INVENTOR(S) : Levkowetz Page 1 of 2

It is certified that error appears in the above-identified patent and that said Letters Patent is hereby corrected as shown below:

On the Title Page, item (56), under "FOREIGN PATENT DOCUMENTS",
in Column 2, Line 1, delete "EP 1845681 * 4/2006".

On the Title Page, item (56), under "FOREIGN PATENT DOCUMENTS",
in Column 2, Line 2, delete "EP 1845681 A 10/2007".

On the Title Page, item (56), under "FOREIGN PATENT DOCUMENTS",
in Column 2, Line 3, delete "SE EP 1845681 * 10/2007" and
insert -- EP 1845681 * 10/2007 --, therefor.

In the Drawings:

In Fig. 1, Sheet 1 of 8, delete "120i" and insert -- 120 --, therefor.

In the Specifications:

In Column 7, Line 26, delete "node 110" and insert -- node 105 --, therefor.

In Column 7, Line 31, delete "APii" and insert -- AP 110ii --, therefor.

In Column 8, Line 47-48, delete "node 100," and insert -- node 105, --, therefor.

In Column 9, Line 15, delete "node 110" and insert -- node 105 --, therefor.

In Column 10, Line 56, delete "node 110i" and insert -- node 105 --, therefor.

In Column 12, Line 26, delete "point 515," and insert -- point 110, --, therefor.

Signed and Sealed this
Twenty-eighth Day of January, 2014

Michelle K. Lee
*Deputy Director of the United States Patent and Trademark Office*

CERTIFICATE OF CORRECTION (continued)
U.S. Pat. No. 8,542,634 B2

In Column 13, Line 19, delete "NAT 620" and insert -- NAT 520 --, therefor.

In Column 14, Line 48, delete "handler 520" and insert -- handler 530 --, therefor.

In Column 14, Line 49, delete "point 530" and insert -- point 110 --, therefor.

In Column 15, Line 2, delete "point 635" and insert -- point 110 --, therefor.

In Column 15, Line 30, delete "point 705." and insert -- point 110. --, therefor.

In the Claims:

In Column 17, Line 54, in Claim 1, delete "an" and insert -- a --, therefor.

In Column 18, Line 16, in Claim 6, delete "true:" and insert -- true; --, therefor.